UNITED STATES PATENT OFFICE 2,480,638

PURIFICATION OF CONCENTRATED OIL SOLUTIONS OF POLYVALENT METAL SULFONATES

Gordon W. Duncan, Westfield, and John C. Zimmer, Union, N. J., assignors to Standard Oil Development Company, a corporation of Delaware No Drawing. Application December 29, 1945, Serial No. 638,429

8 Claims. (Cl. 252—33)

The present invention relates to lubricants and other petroleum products and more specifically to an improved method for the manufacture of additive compounds useful in rust preventives, greases, engine oils and other compositions using petroleum oil as a base.

It is known that polyvalent metal sulfonates, particularly calcium and barium sulfonates, are useful as additives in many petroleum oil products. Oil-soluble calcium and barium sulfonates are obtainable from preferentially oil-soluble sulfonic acids. The oil-soluble sulfonic acids may be synthetically derived by sulfonating olefins, aliphatic fatty alcohols or their esters, alkylated aromatics or their hydroxy derivatives, partially hydrogenated aromatics, etc., with sulfuric acid or other sulfonating agents. However, the sulfonic acids which are usually produced during the treatment of lubricating oil distillates with concentrated sulfuric acid (85% or higher concentration) and which remain in the oil after settling out sludge, are the most abundant and provide the preferred source of sulfonic acids. These sulfonic acids may be represented as

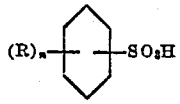

where (R) is 1 or more alkyl, alkaryl or aralkyl groups, and the aromatic nucleus may be a single or condensed ring or a partially hydrogenated ring. The most desirable sulfonic acids are those having molecular weights of 350 to 500, such as are formed when treating petroleum distillates having viscosities in excess of 90 S. U. S. at 210° F. with strong acid.

Sludge-free acid oil generally contains less than 15% dissolved sulfonic acids. These sulfonic acids can be converted directly into their calcium or barium salts by neutralizing the acids with an aqueous solution or suspension of the oxide, hydroxide or other alkaline-reacting salt or compound of calcium or barium, yielding oil solutions of calcium or barium sulfonate of up to about 15% concentration containing an excess of the neutralizing agent and by-products of the reaction, which are very difficult to remove by ordinary purification procedures. However, a 15% oil solution of the oil-soluble metal sulfonate is not practical for use as an additive concentrate, and therefore methods of increasing the concentration of the sulfonate salts in the oil must be resorted to.

The usual method employed to remove sulfonic acids from acid-treated oils and thus obtain sulfonates in concentrated form, is by neutralization with caustics, such as sodium or potassium hydroxide or carbonate to form alkali metal soaps which are extracted from the oil by solvents such as aqueous alcohol. After removing the solvent by distillation, leaving an oil solution of the alkali metal sulfonate containing considerable water and inorganic salts, the soaps must again be dissolved in a solvent for the purpose of settling out the inorganic salts in the form of brine which is discarded and the solvent again removed by distillation, leaving a concentrate consisting of from 20 to 70% of alkali metal soaps dissolved in oil. Where oil-soluble alkaline earth metal sulfonates are desired, the alkali metal sulfonates are converted to the alkaline earth metal sulfonates by double decomposition of the alkali metal sulfonate with a salt, such as the chloride, or mixtures thereof with the oxide or hydroxide of the selected alkaline earth metal in aqueous solution.

Double decomposition of the alkali metal sulfonates with aqueous solutions of salts of the desired alkaline earth metal can conveniently be carried out using the alcoholic solution of the sulfonate obtained on extraction of the alkali neutralized acid oil. In this case a 10-30% aqueous solution of the alkaline earth metal salt, in an amount 10-100% in excess of the theoretical amount required, is well mixed with the sulfonate solution at substantially atmospheric temperature. The alkaline earth sulfonate, containing some alkali metal sulfonate, salts, oil and water, precipitates as a curdy mass. This mass is fluxed with oil, dehydrated by heating to 275-325° F. and filtered free of insoluble material.

If the charge stock is the purified sodium sulfonate concentrate in oil, it is adjusted to the desired final concentration by the addition of oil, and a 10-30% aqueous solution of alkaline earth metal salt in 10 to 100% excess of theoretical is emulsified with the oil phase. In some cases a small amount of the alkaline earth hydroxide is also incorporated to maintain alkalinity. The mixture is then heated to 275-325° F. to drive off the water and the product filtered to remove insoluble salts.

Although the products obtained by either of the above processes are clear and fluid, analyses indicate that they contain appreciable quantities of inorganic salts, apparently present as complexes with the sulfonate. This is shown by metal contents of up to 100% in excess of that required to neutralize the sulfonic acids and also by high contents of the acid radical of the salt use to effect double decomposition. While for some uses this complex compound is not objectionable and may sometimes even be desirable, for certain other uses the non-sulfonate salt must be removed. An example is in the manufacture of the sulfonate greases disclosed in our co-pending application, U. S. Serial No. 570,785, now Patent Number 2,444,970, issued July 13, 1948. While the above-mentioned contaminants may be removed by extensive water washing the emulsifiable nature of the sulfonate concentrate renders this operation difficult if not impractical.

The principal object of the present invention is an improved method for the production of concentrates of oil-soluble alkaline earth metal sulfonates. Another object is the provision of a method for removing impurities from oil solutions of alkaline earth metal sulfonates. These and other objects will be apparent to those skilled in the art upon reading the following description.

According to the present invention a process has been discovered by means of which oil-soluble alkaline earth metal sulfonate concentrates free of excess alkaline earth metal compounds and inorganic salts can be prepared in a rapid and efficient manner. Broadly speaking the objects of the present invention are accomplished by taking the crude reaction product resulting from the double decomposition reaction between an oil-soluble alkali metal sulfonate and an alkaline earth metal compound in oil solution and treating it with aqueous inorganic acidic material capable of forming water-and oil-insoluble salts with alkaline earth metals, until all excess alkaline earth metal is reacted. During this operation the hydrochloric acid or other acid formed by reaction of the inorganic salts present with the added acid is evaporated by maintaining the mass at a temperature just below the decomposition temperature of sulfonic acids (170-180° F.) and causing a reduction in effective pressure either through the application of vacuum or through blowing with an inert gas. If need be the mass is then just neutralized with an alkaline earth metal hydroxide or carbonate and filtered to remove insoluble inorganic salts. Such procedure gives an oil concentrate of normal alkaline earth metal sulfonate of from 20–50% concentration, depending upon the concentration of alkali metal sulfonates in the original oil solution, substantially free of excess alkaline earth metal compounds and other inorganic salts.

Accordingly, the present invention contemplates a process wherein a petroleum oil concentrate of alkali metal sulfonate containing 20–50% or more of the sulfonate, is reacted with an amount of alkaline earth compound, at least equal to 1 equivalent weight, based upon the amount of alkali metal sulfonate in the oil, in the form of a salt such as calcium chloride, barium chloride or strontium chloride, heating to a temperature of about 300° F. to complete the reaction, and eliminate water, and filtering to remove precipitated alkali metal chlorides. The resultant product is a solution of alkaline earth sulfonate-chloride complex which is then ready for further treatment as subsequently described to obtain a substantially pure solution of alkaline earth metal sulfonate in oil. Alternatively, a previously formed concentrate of crude alkaline earth metal sulfonate in petroleum oil may be employed. The purification operation consists of treatment with an acid material such as sulfuric acid, carbon dioxide, sulfur dioxide, phosphoric acid, oxalic acid, etc., which is capable of forming water- and oil-insoluble salts with alkaline earth metals, in a quantity sufficient to react with all the excess metal compounds present and warming, at subatmospheric pressure, if desired, to a temperature of not more than 180° F. to drive off volatile products. Blowing the mixture with the acid gases, or even inert gases, is helpful in driving off hydrochloric acid formed. If after warming and driving off volatile products the mixture remains acid, it is neutralized with an alkaline earth metal hydroxide or carbonate and filtered, preferably in the presence of any of the well-known filter aids, such as diatomaceous earth, to give a clear solution of alkaline earth metal sulfonate in oil substantially free of excess alkaline earth metal or other inorganic salts.

The following illustrative examples are given as instances of specific embodiments of the present invention.

*Example 1*

A 30% oil solution of sodium sulfonate was emulsified with an aqueous solution of calcium chloride in 50% excess of theoretical, 0.5% calcium hydroxide was added, and the mixture heated to 300° F. and filtered. 200 g. of this clear calcium sulfonate solution in mineral lubricating oil, analyzing sodium 0.05%; calcium 1.71%; sulfur 2.13%, which corresponds to sodium sulfonate 1%; calcium sulfonate 29.2% and excess calcium 0.47%, was mixed with 20 cc. of 11% sulfuric acid, agitating to provide intimate contact. The mixture was heated to 165° F., at atmospheric pressure for 30 minutes with carbon dioxide blowing to drive off hydrochloric acid formed from the excess calcium chloride used in making the calcium sulfonate. The mixture was then made neutral by the careful addition of aqueous calcium hydroxide, 10 g. of diatomaceous earth was added and the mixture heated to 300° F. and filtered. The filtrate analyzed sodium .026%; calcium 1.21%; sulfur 2.15%, from which the calculated analysis is sodium sulfonate 0.5%; calcium sulfonate 29.7% and excess calcium—nil.

*Example 2*

200 g. of the fluid calcium sulfonate-calcium chloride complex concentrate described in Example 1 was emulsified with 50 g. of water and the emulsion blow with sulfur dioxide gas at 170° F. with mechanical agitation for 30 minutes. The product was heated to 300° F. to dehydrate it, filtered with 5% Hyflo filter aid, and a clear solid concentrate of normal calcium sulfonate was obtained.

*Example 3*

Example 2 was repeated employing carbon dioxide gas as the precipitating material and the sulfonate concentrate obtained showed an excess metal content of only 0.15%.

What is claimed is:

1. A method of removing inorganic salt impurities from an oil solution containing at least 20% of oil-soluble polyvalent metal sulfonates made by the double decomposition of alkali metal sulfonates and polyvalent metal compounds which comprises treating said oil solution containing the reaction product produced during said double decomposition reaction with an inorganic acidic material capable of forming water-insoluble salts with polyvalent metals and filtering to remove insoluble salts thus formed.

2. A method of removing excess calcium and other inorganic salts from oil solutions containing at least 20% of oil-soluble calcium metal sulfonates made by the double decomposition of alkali metal sulfonates and calcium compounds which comprises treating said oil solutions containing the reaction product produced during said double decomposition with an inorganic acidic material capable of forming water-insoluble salts with said excess calcium.

3. A method of removing excess barium and other inorganic salts from oil solutions containing at least 20% of oil-soluble barium sulfonates made by the double decomposition of alkali metal sulfonates and barium compounds which comprises treating said oil solutions containing a reaction product produced during said double decomposition reaction with an inorganic acidic material capable of forming water-insoluble salts with barium and filtering to remove insoluble salts thus formed.

4. A method of removing excess alkaline earth metals and other inorganic salt impurities from an oil solution containing at least 20% of oil-soluble alkaline earth metal sulfonates made by the double decomposition of alkali metal sulfonates and alkaline earth metal compounds which comprises treating said oil solution containing the reaction product produced during said double decomposition reaction with sufficient sulfuric acid to combine with the excess metal present, heating to a temperature not higher than 180° F. under conditions adapted to drive off volatile material, neutralizing with an alkaline earth metal carbonate and filtering to remove insoluble salts thus formed.

5. A method of removing excess alkaline earth metals and other inorganic salt impurities from an oil solution containing at least 20% of oil-soluble alkaline earth metal sulfonates made by the double decomposition of alkali metal sulfonates and alkaline earth metal compounds which comprises heating said oil solution containing the reaction product to 180° F. under conditions adapted to drive off volatile material while blowing with an acid anhydride gas selected from the group consisting of $SO_2$ and $CO_2$ until the excess metal present has been reacted.

6. A method of removing excess calcium and other inorganic salt impurities from an oil solution containing at least 20% of oil-soluble calcium sulfonate made by the double decomposition of alkali metal sulfonates and calcium compounds which comprises heating said oil solution to a temperature of 180° F. and blowing the heated mixture with $SO_2$.

7. The process of preparing a concentrated mineral oil solution of oil soluble alkaline earth metal sulfonates containing at least 20% or more of said sulfonate, which comprises reacting a mineral oil solution of alkali metal sulfonate of at least 20% concentration by weight with an aqueous alkaline earth metal salt, heating to a temperature and for a time sufficient to evaporate the water and complete the reaction, filtering, treating with a sufficient quantity of an acidic material capable of forming water insoluble salts of said alkaline earth to react with all the excess alkaline earth metal compounds present, and heating moderately to drive off volatile acids formed by said last-mentioned reaction without decomposing said sulfonate.

8. Process as in claim 7 wherein said acid treated material is further neutralized with an alkaline earth basic composition and filtered.

GORDON W. DUNCAN.
JOHN C. ZIMMER.

REFERENCES CITED

The following references are of record in the file of this patent:

UNITED STATES PATENTS

| Number | Name | Date |
|---|---|---|
| 513,204 | Schroter | Jan. 23, 1894 |
| 518,989 | Frasch | May 1, 1894 |
| 722,506 | Helmers | Mar. 10, 1903 |
| 1,933,070 | Pilat et al. | Oct. 31, 1933 |
| 2,395,774 | Amott et al. | Feb. 26, 1946 |